United States Patent [19]

Sharp

[11] Patent Number: 5,078,187
[45] Date of Patent: Jan. 7, 1992

[54] VENTED STORAGE TANK SYSTEMS WITH INTERNAL OVERFILL MEANS

[76] Inventor: Bruce R. Sharp, 7685 Fields-Ertel Rd., Cincinnati, Ohio 45241

[21] Appl. No.: 405,198

[22] Filed: Sep. 11, 1989

Related U.S. Application Data

[63] Continuation-in-part of Ser. No. 279,836, Dec. 5, 1988, abandoned, which is a continuation-in-part of Ser. No. 66,691, Jun. 26, 1987, abandoned, which is a continuation-in-part of Ser. No. 820,027, Aug. 11, 1987, Pat. No. 4,685,327, which is a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and Ser. No. 580,800, Feb. 16, 1984, Pat. No. 4,524,609, which is a continuation-in-part of Ser. No. 544,012, Oct. 21, 1983, abandoned, and Ser. No. 745,540, Jun. 17, 1985, abandoned.

[51] Int. Cl.⁵ ............... F16K 24/00; B65B 31/00
[52] U.S. Cl. .................. 141/198; 137/587; 220/86.001; 141/59; 141/290; 141/35
[58] Field of Search ............ 141/192, 198, 35, 51, 141/54, 57, 59, 86, 230, 231, 232, 285, 290, 301, 302; 137/587, 588, 589, 592, 386, 393; 220/85 S, 86 R

[56] References Cited

U.S. PATENT DOCUMENTS

| | | | |
|---|---|---|---|
| 3,381,723 | 5/1968 | Quest | 141/54 X |
| 3,494,387 | 2/1970 | Gillies et al. | 141/40 |
| 3,732,902 | 5/1973 | Muller | 141/198 |
| 3,770,028 | 11/1973 | Madden | 141/59 |
| 3,807,465 | 4/1974 | Ginsburgh et al. | 141/285 |
| 3,908,718 | 9/1975 | Bower | 141/59 |
| 3,983,913 | 5/1976 | Bower | 141/95 |
| 4,083,387 | 4/1978 | Stieber et al. | 141/95 |
| 4,513,795 | 4/1985 | Davis et al. | 141/35 |
| 4,592,386 | 6/1986 | Mooney | 137/588 |
| 5,018,558 | 5/1991 | Sharp | 141/198 |

Primary Examiner—Ernest G. Cusick
Attorney, Agent, or Firm—Charles R. Wilson

[57] ABSTRACT

An underground storage tank system has an internal retained capacity area for receiving excess liquid from a filling operation. The storage tank system comprises a rigid storage tank, fill pipe, vent line, vent extension line, dispensing line, and trapped vapor release valve. The vent extension line extends into the storage tank. The lower end of the vent extension line within the storage tank defines a horizontal plane above which is an internal retained capacity area. The trapped vapor release valve is closed during a filling operation so that eventually a build up or pressure occurs within the retained capacity area to prevent further flow of liquid to the tank. Opening of the trapped vapor release valve relieves the pressure in the retained capacity area thereby allowing excess liquid in the fill pipe and delivery hose to drain into the rigid storage tank.

13 Claims, 6 Drawing Sheets

VENTED STORAGE TANK SYSTEMS WITH INTERNAL OVERFILL MEANS

This application is a continuation-in-part of "Storage Tank System With Internal Overfill Means", Ser. No. 07/279,836, filed Dec. 5, 1988, now abandoned, which is a continuation-in-part of "Total Containment and Overfill Storage Tank System", Ser. No. 07/066,691, filed June 26, 1987, now abandoned, which is a continuation-in-part of "Total Containment Storage Tank System", Ser. No. 06/820,027, filed Aug. 11, 1987, now U.S. Pat. No. 4,685,327, which is a continuation-in-part of "Storage Tanks Having Secondary Containment Means," Ser. No. 06/740,869, filed June 3, 1985, now U.S. Pat. No. 4,607,522, which is a continuation-in-part of "External Jacket System As Secondary Containment For Storage Tanks", Ser. No. 06/544,013, filed Oct. 21, 1983, now U.S. Pat. No. 4,523,454 and "Storage Tank Systems", Ser. No. 06/580,800 filed Feb. 16, 1984, now U.S. Pat. No. 4,524,609 which is a continuation-in-part of "Storage Tank Systems", Ser. No. 06/544,012, filed Oct. 21, 1983, now abandoned; and a continuation-in-part of "Fiberglass Reinforced Resin Storage Tanks With Secondary Containment Means", Ser. No. 06/745,540 filed June 17, 1985, now abandoned.

FIELD OF THE INVENTION

This invention relates to a liquid storage tank system. More particularly, the invention relates to an underground storage tank system having a means to safely handle overfill liquid from a filling operation.

BACKGROUND OF THE INVENTION

Storage tanks are widely used for storing a variety of liquids. Some of these liquids are hazardous and can be corrosive and/or flammable. In particular, underground storage tanks are used extensively for the storage of liquid gasoline at retail gasoline stations. Filling of the tanks is accomplished from a transport tank truck parked adjacent the top of a fill pipe located at ground level. The fill pipe is permanently connected to the underground storage tank. The transport tank truck operator attaches a flexible delivery hose leading from the transport tank truck's control panel to a liquid tight fitting on the top end of the tank's fill pipe. The operator next opens a valve located at the transport tank truck. Gasoline fills the flexible hose, the underground tank's fill pipe and finally the storage tank.

The filling operation is normally accomplished by gravity 15 unloading of the gasoline in the transport tank truck to the underground tank. The gasoline flows into the underground storage tank until the filling operation is stopped by the tank truck operator or the underground tank and access pipes completely fill creating an overfill situation. Such overfill results in a substantial amount (up to about thirty-five gallons) of gasoline trapped in the commonly used four inch diameter flexible delivery hose. When an overfill occurs the operator first turns off the valve at the transport tank truck. Unless special precautions are taken, gasoline contained within the flexible delivery hose is spilled onto the ground causing earth and water contamination.

Present underground tanks are required by federal regulations to have an overfill containment device to prevent overfilling. Various overfill devices and auxiliary holding tank systems are known in the prior art. Examples of these are disclosed in U.S. Pat. Nos. 3,983,913; 4,204,564; and 4,501,305. The disclosed systems are not fully satisfactory in one way or another.

There has now been discovered a storage tank system with provision for overfilled liquid. The present invention solves the problems inherent with existing storage tank systems and auxiliary overfill equipment.

SUMMARY OF THE INVENTION

The storage tank system of the invention comprises (a) a rigid storage tank, (b) a fill pipe extending from near ground surface into the storage tank, (c) a vent line and vent extension line extending into the storage tank wherein a lower end of the vent extension line terminates from about two inches to about eighteen inches from the top inside surface of the tank's storage area and the vent line is open to the atmosphere, (d) a dispensing line leading from within the storage tank to a dispenser at ground surface; and (e) a trapped vapor release valve in operable association with the tank's storage 2 area. A retained capacity area in the storage tank comprises that portion of the tank's storage area which is above the lower end of the vent extension line. The trapped vapor release valve is closed during a filling operation so that vapors in the retained capacity area will prevent liquid from so entering. Opening of the trapped vapor release valve vents the trapped vapors and allows liquid in the delivery hose to flow into the retained capacity area. Optionally, a two point fill system is used wherein a fill pipe and a vapor recovery tube are provided.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention.

Figure 1:
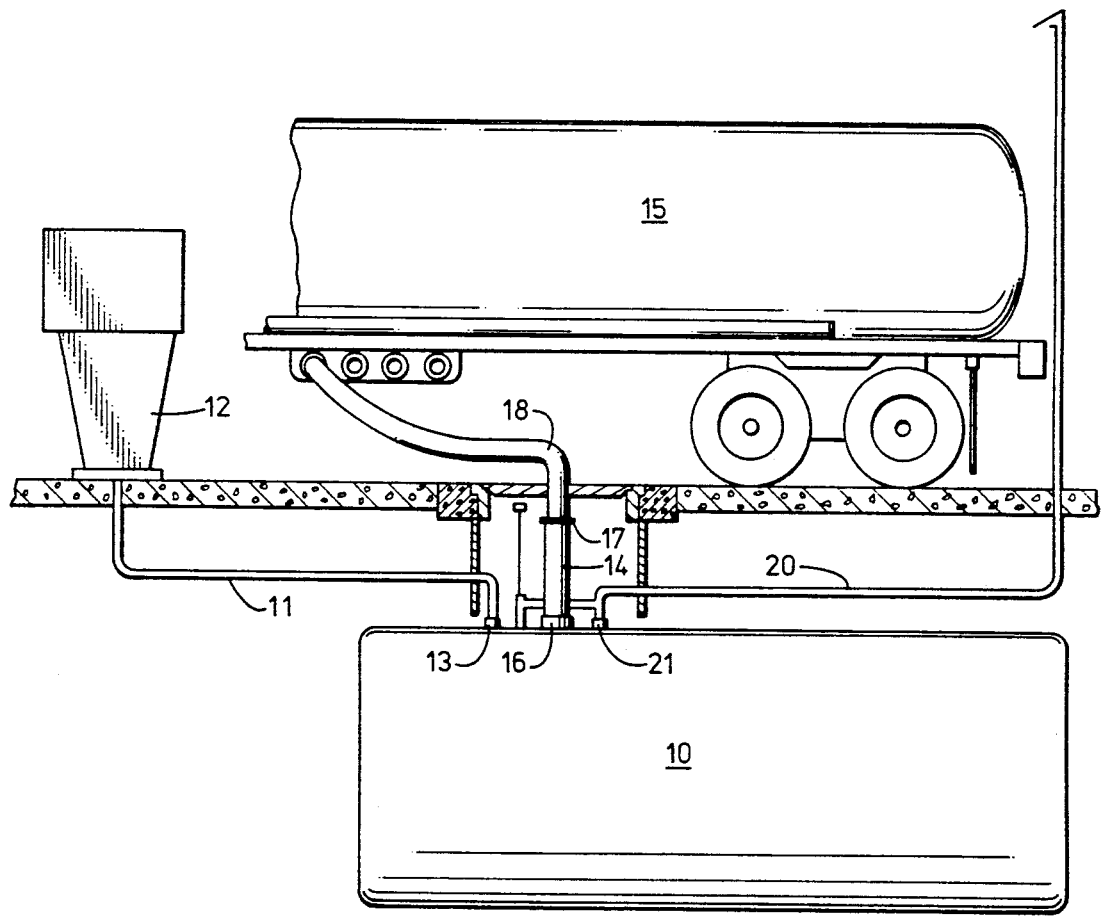
FIG. 1 is a side view of a storage tank system of this invention in the process of being filled from a transport tank truck.
Figure 2:
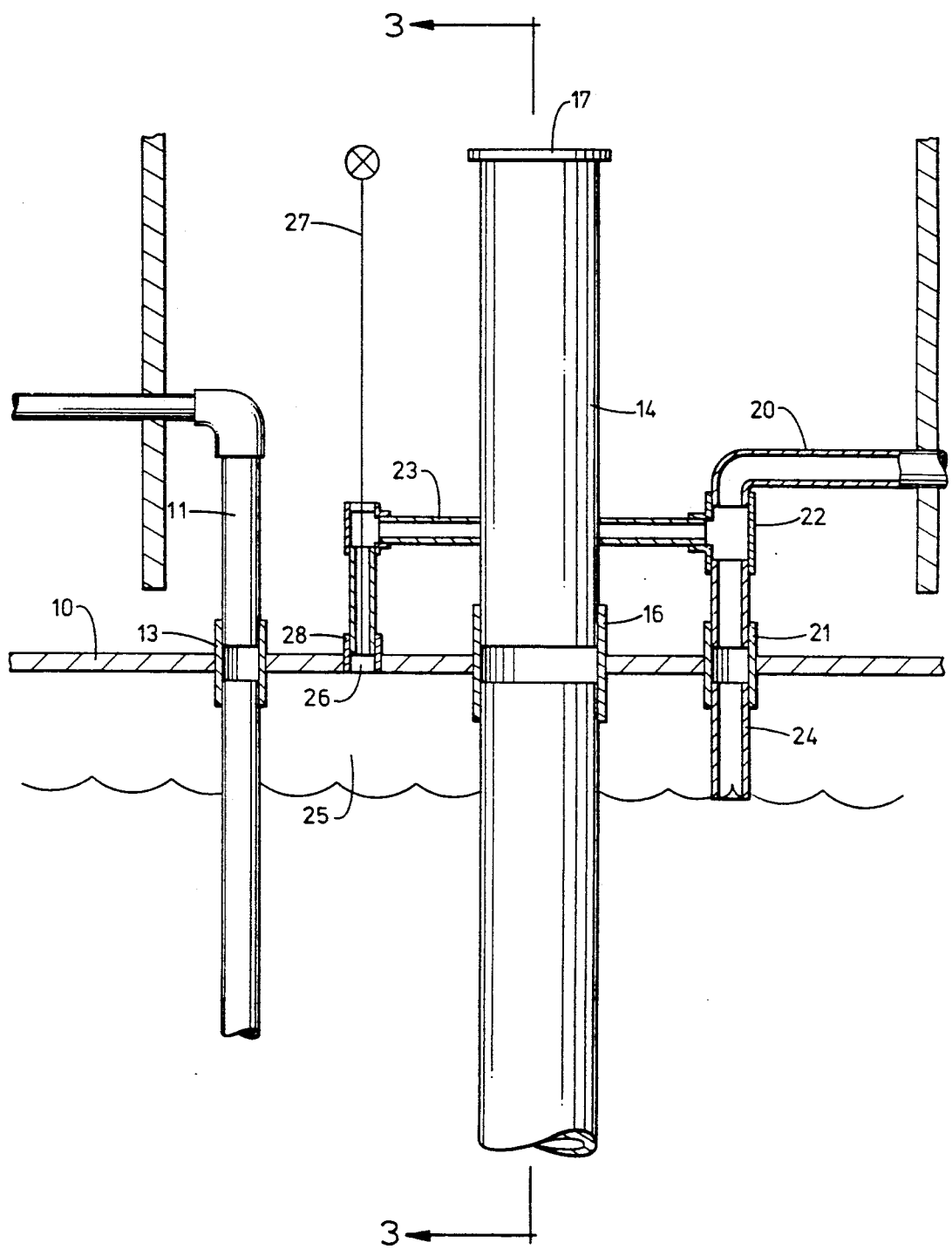
FIG. 2 is a partial side view of the storage tank system of FIG. 1 showing an internal retained capacity area.
Figure 3:
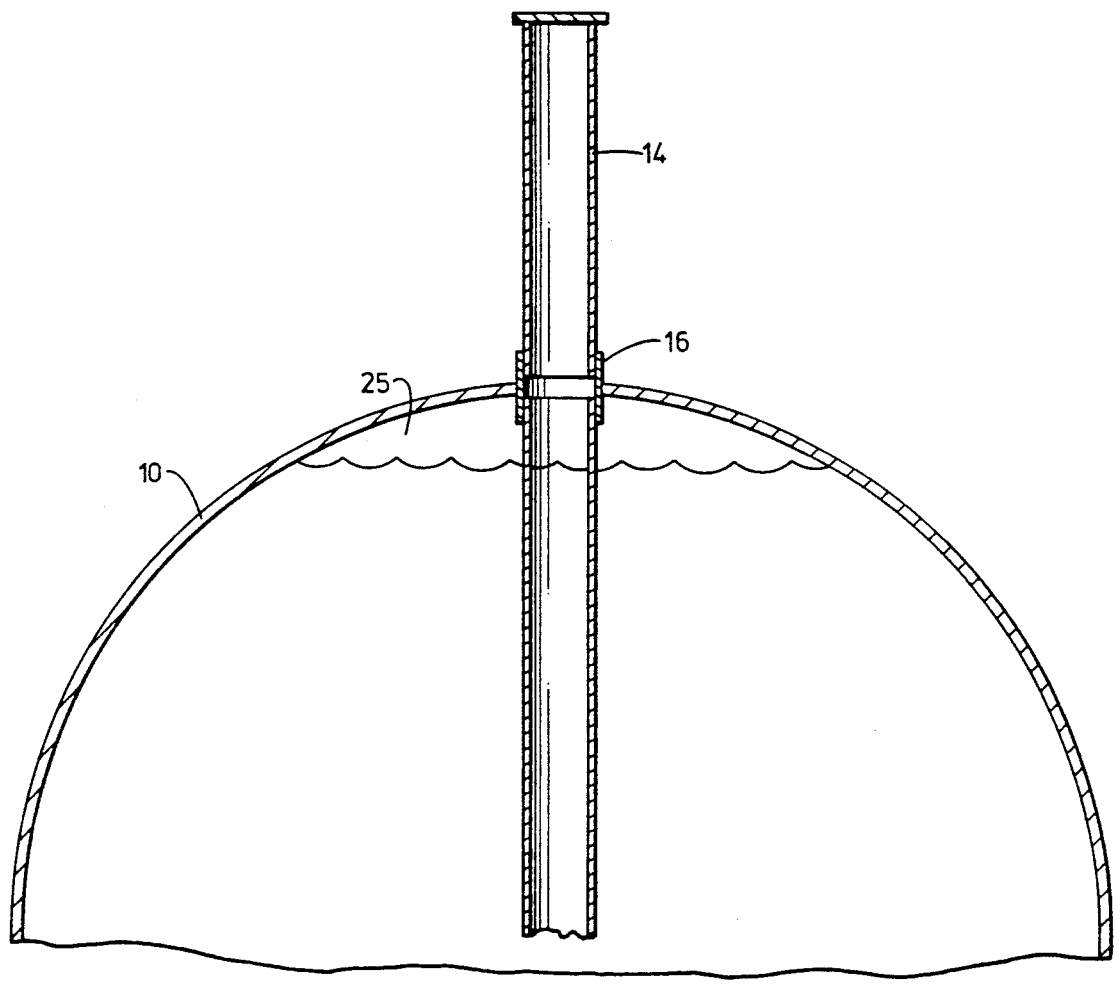
FIG. 3 is a end view taken along lines 3—3 of FIG. 1 showing the internal retained capacity area for handling overfilled liquid.

With reference to FIGS. 1-3 there is shown an underground storage tank 10. Storage tanks 10 of the type shown are well known and are widely used, especially in the gasoline service station industry. They are typically made of metal or, more recently, a fiberglass reinforced resin material. Either type of tank or a composite structure of the two has use in this invention. Such tanks have a capacity of at least about 1,000 gallons of liquid, preferably at least about 4,000 gallons of liquid and are usually buried about four feet below ground surface. A typical metal storage tank is shown in FIG. 1. The tank is cylindrically shaped. Various support and hold-down means (not shown) are used to keep the tank stationary. Access lines for dispensing, filling, and venting operations lead into the tank's interior storage area. Such lines are attached to the tank's top surface in a liquid tight fashion. As shown a ground level manway pit is provided to allow convenient access to all the access lines and tank.

Dispensing line 11 is used for withdrawing gasoline from the tank and delivering it to the consumer through gasoline dispenser 12. The line is secured to the storage tank by means of a double tapped bushing 13. As shown, line 13 is comprised of several sections joined together by liquid tight fittings. The line extends down into the tank to near its bottom surface. Normally a submerged pump is positioned within the tank to supply the dispenser. Another method of pumping the gasoline from the tank is accomplished by the dispenser having contained within it a suction pump to withdraw the gasoline from the tank.

A fill pipe 14 extends from the storage tank 10 to near ground surface. It provides as its obvious function the conduit through which gasoline flows into the storage tank from an outside source, e.g., a transport tank truck 15. The fill pipe preferably extends into the tank's storage area to near its bottom surface, i.e. within about twelve inches to minimize splashing and vapor formation during a filling operation. The fill pipe 14, comprised of two sections, is securely fastened to a double tapped bushing 16, which is attached to the top of storage tank 10. A removable cap (not shown) attaches to a cap adapter 17 at a top end of the fill pipe. The cap adapter is used for assuring a liquid tight attachment with the transport tank truck's delivery hose 18.

A vent line 20 leading into the storage tank 10 provides a means by which displacement of air/vapors can be directed to the atmosphere primarily during one part of the filling operation and also prevents a vacuum formation during emptying of tank 10. The vent line 20 is secured to the top of the tank by use of double tapped bushing 21. As evident in FIG. 2, vent tee 22 is provided in the vent line to accommodate a by-pass vent line 23 as further discussed below. In normal practice, the vent line 20 ends at the top of the storage tank. In accord with this invention, a lower vent extension line leads from bushing 21 into the uppermost portion of the interior storage area. The vent extension line extends from about two inches to about eighteen inches from the top inside surface of the storage tank into the tank's interior Preferably, the vent extension line ends from about two inches to about five inches from the top inside surface of the tank's storage area. Optionally, a ball float valve (not shown) is installed at the end of the vent extension line 24 to prevent liquid from entering. The area 25 within the storage tank is defined by an imaginary horizontal plane extending from the lower end of the vent extension line 24 within the tank and the upper walls of the tank. This area is referred to herein as the storage tank's internal retained capacity area. The retained capacity area is capable of holding at least about five gallons, with the most preferred capacity being about thirty to about fifty gallons. In operation, the retained capacity area is used to receive excess liquid primarily from the transport tank truck's delivery hose and the fill pipe.

When the liquid being filled into tank 10 reaches the uppermost conduit opening within the tank, i.e. the lower end of line 24, air and other vapors will become trapped in the tank to form the interior retained capacity area 25. A pressure build-up within this area from a lack of venting will prevent additional liquid from entering the tank. Any liquid which continues to flow from the transport truck will occupy the fill pipe 14, vent extension line 24, vent line 20 (including by-pass vent line 23) and delivery hose 18 to equalized levels with liquid remaining in the transport tank truck. The filling operation is effectively terminated with a consequent overfill situation. After the delivery hose valve at the transport tank truck is turned off, pressure is relieved in the retained capacity area and said area is used to receive drained liquids from the delivery hose and other conduits.

Pressure is controlled in the retained capacity area 25 by use of the by-pass vent line 23 and a trapped vapor release valve 26. By-pass vent line 23 leads from the storage tank 10 to the vent line 20. A control rod 27 is operably associated with trapped vapor release valve 26. The by-pass vent line is connected securely by bushing 28 to the top surface of the tank. It communicates with the vent line 20 through vent tee 22. When valve 26 is opened the trapped vapors are vented out of the retained capacity area 25 through by-pass vent line 23 and atmospheric vent line 20. This effectively equalizes the pressure in the retained capacity area with atmospheric pressure. The liquid trapped in the flexible delivery hose, fill pipe, vent line, by-pass vent line and vent extension line can now drain by gravity and displace the trapped vapors in the retained capacity area 25. It is thus seen that overfilled liquid is effectively contained and ultimately drained into the storage tank without need for costly and elaborate equipment.

Figure 4:
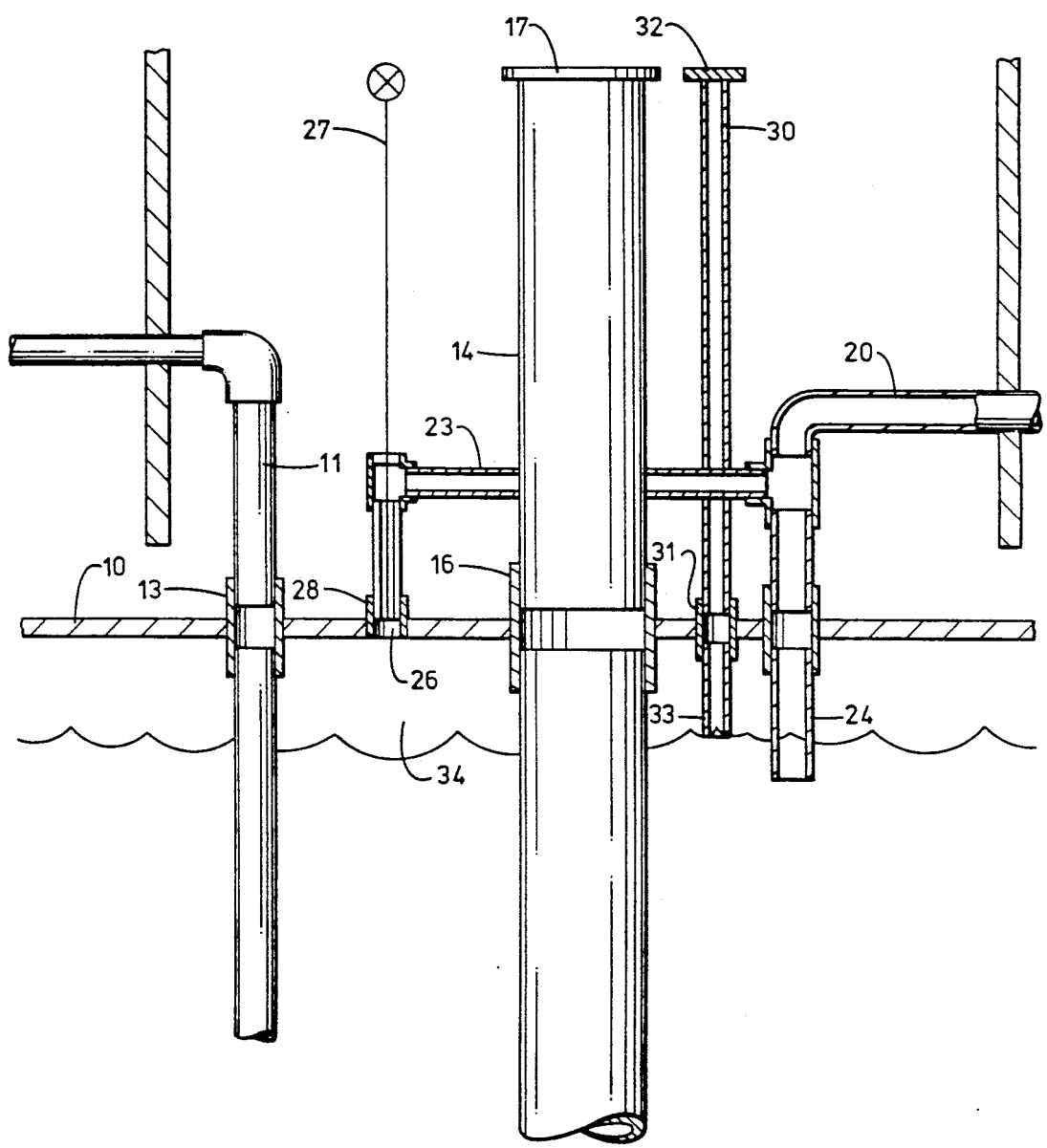
FIG. 4 is a partial side view of a two point fill storage tank system having an internal retained capacity area within a rigid storage tank as defined by the end of a vapor recovery extension tube.

A two point fill system is used in the embodiment of the invention shown in FIG. 4. The fill system is comprised of the fill pipe 14 and a vapor recovery tube 30. The vapor recovery tube 30 returns vapors formed within the storage tank during the filling operation to the transport tank truck, and thus, effectively handles such vapors without polluting the atmosphere. The vapor recovery tube 30 is securely fastened to double tapped bushing 31 which is attached to the top of the tank 10. In normal practice, the vapor recovery tube does not extend into the storage tank, but rather ends at the bushing 31. A removable cap (not shown) attaches to a cap adapter 32 at a top end of the recovery tube 30 to prevent debris from entering the storage tank. The transport tank tuck is equipped with a delivery hose and a vapor recovery hose. Fill systems of this general nature are common and are mandated in many areas. In accord with this invention, a vapor recovery extension tube 33 leading from the vapor recovery tube 30 extends from about two inches to about eighteen inches, preferably from about two inches to about five inches, from the top inside surface of the storage tank into the tank's interior.

In this embodiment of the invention the internal retained capacity area of the storage tank is that area of the tank which is defined by an imaginary horizontal plane extending from the uppermost of the lower ends of the vapor recovery extension tube 33 and the vent extension line 24. As depicted in FIG. 4 the retained capacity area 34 extends from the lower end of the vapor recovery extension tube 33.

Figure 5:
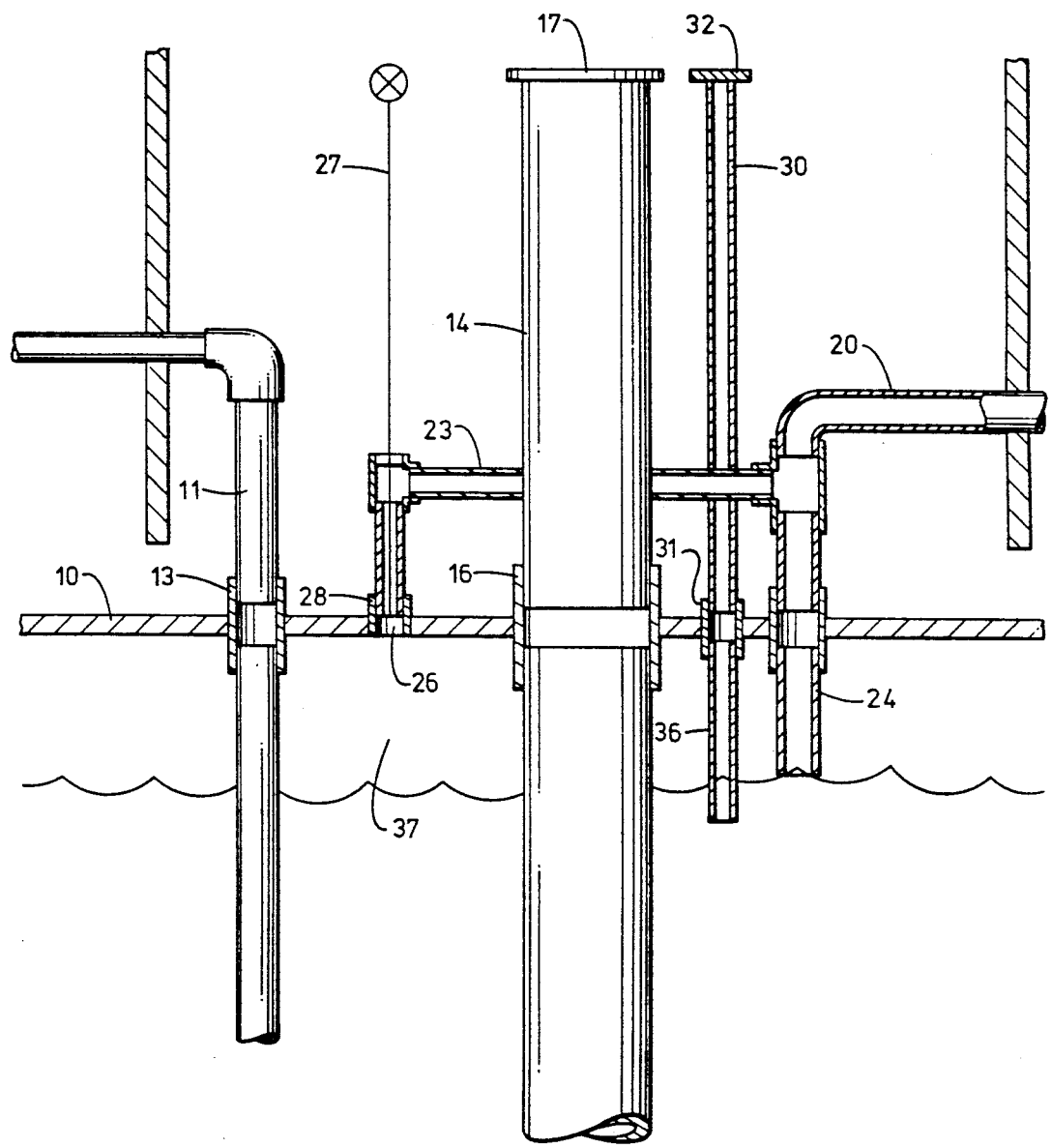
FIG. 5 is a partial side view of still another two point fill storage tank system having an internal retained capacity area within a rigid storage tank as defined by the end of a vent extension line.

FIG. 5 illustrates an embodiment of the invention wherein the end of vent extension line 24 is higher than the end of a vapor recovery extension tube 36. In this figure, the storage tank 10 and access lines perform the same function as above described with reference to FIG. 4. However, the ends of the vent extension line 24 and vapor recovery extension tube 36 terminate at different levels within the storage tank. In this situation the retained capacity area 37 extends from the lower end of the vent extension line 24 to the top surface of the storage tank.

Figure 6:
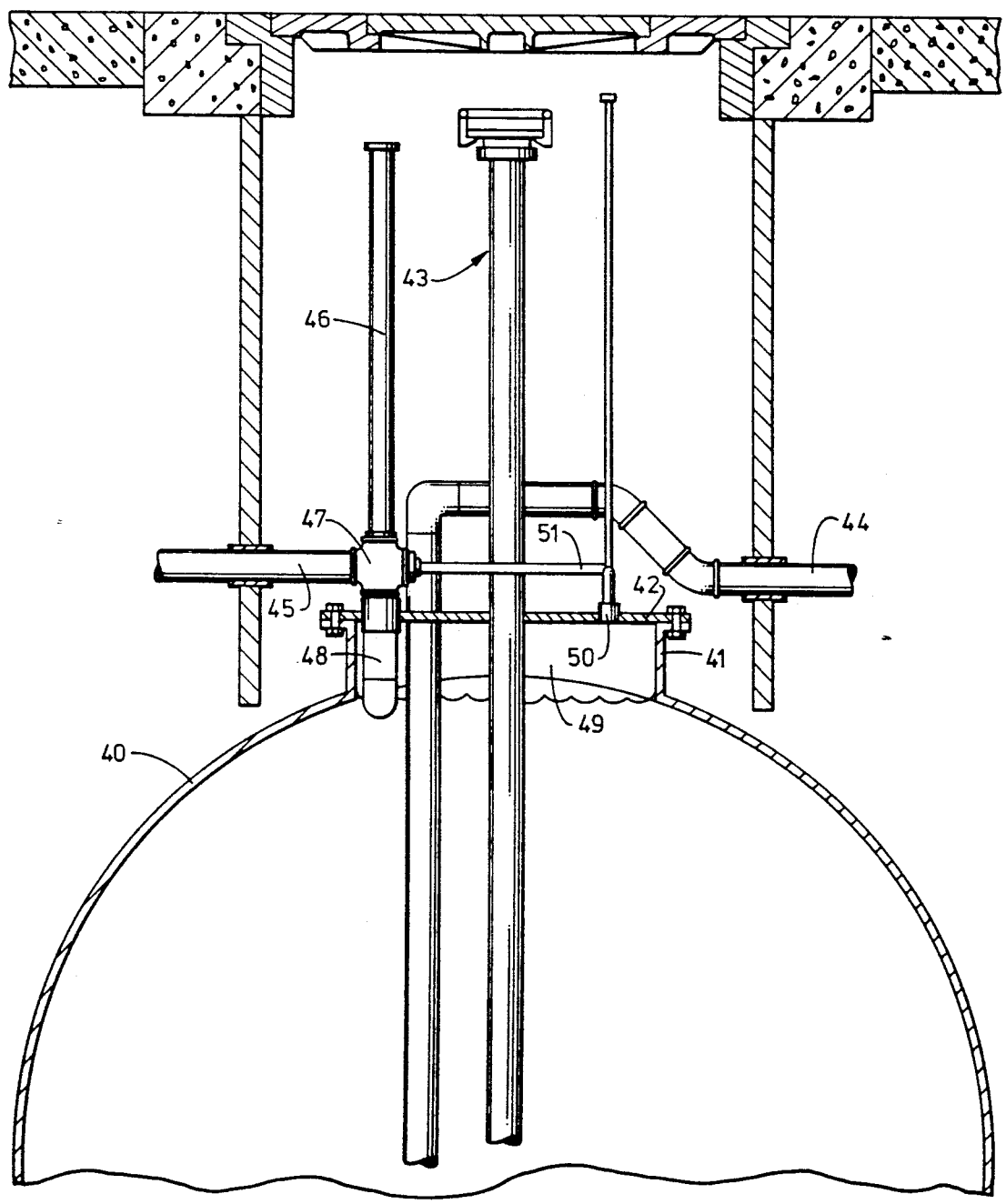
FIG. 6 is an end view illustrating another storage tank system of this invention wherein a manway is positioned on top of a rigid storage tank.

FIG. 6 illustrates another type of storage tank useful with the invention. As shown, the rigid storage tank 40 has a manway 41 for access to its interior. The manway is secured in a liquid tight fashion to the top of the storage tank. The manway's primary function is to serve as an access way to gain entry to the interior of the storage tank. It is generally cylindrical in shape and preferably sized about one to three feet in diameter. Other shapes and dimensions can be utilized. A lid 42, opening into the storage tank's interior, is securely attached to the top of the manway 41. It is securely fastened, preferably in liquid tight fashion by known attachment means, e.g., bolts and nuts. The lid also serves as a surface through which the access lines pass. Disconnecting all lines passing through the lid and removal of the lid itself will allow an individual to enter the tank.

The fill pipe 43, dispensing line 44 and vent line 45 all individually enter through the lid covering the manway. Liquid tight fittings are provided on the lid for this purpose. Vapor recovery tube 46 is attached to a fitting 47 on the vent line 45 to be in communication with the storage tank interior. Vent line 45 has a vent extension line 48 which extends into the tank from about two inches to about eighteen inches, preferably from about two inches to about five inches from the inside surface of lid 42. The internal retained capacity area 49 of the rigid tank is that area which extends from an imaginary plane level with the lower end of the vent extension line to the top surface of the manway. Thus, the internal capacity area 49 can include all or a part of the area within the manway and a portion or none of the tank's storage area. A trapped vapor release valve 50 operably associated with the retained capacity area and the by-pass vent line 51 is also provided and work in a manner as above described. In this system any air or vapors formed in the storage tank during the filling operation will be drawn back through the vapor recovery tube and into the transport tank truck due to vacuum formation in the truck's tank.

As shown in the figures, the trapped vapor release valve is operably associated with the vent line. A separate trapped vapor vent line can as well extend from the internal retained capacity area to the atmosphere or to the vapor recovery tube to effectively release a pressure build-up in the retained capacity area. A vapor recovery tube can also as well be in communication with the interior of the storage tank by being operably connected to the by-pass vent line.

In operation, a gasoline transport tank truck is parked adjacent a ground access area for a fill pipe leading to a storage tank. The delivery hose is connected to a fitting on the fill pipe and the trapped vapor pressure release valve is closed. Gasoline flows 2 through the fill pipe into the storage tank until a build-up of pressure in the storage tank's retained capacity area causes the gravity flow of gasoline to the storage tank itself to cease. Liquid will continue to flow by gravity to occupy the fill pipe, vapor recovery tube, if used, and vent line. A flow valve at the transport truck is closed. Next, the trapped vapor release valve associated with the retained capacity area is opened. Pressure build-up in the tank is relieved to the atmosphere or back to the truck's tank, thereby allowing gasoline left primarily in the delivery hose and fill pipe to flow by gravity to the retained capacity area of the storage tank.

While the invention has been described with respect to certain embodiments, it should be understood that various modifications may be made without departing from the spirit and scope of the claims.

What is claimed is:

1. An underground storage tank system having an internal retained capacity area for receiving overflow of liquid resulting from a filling operation through a delivery hose from a transport truck, comprising:
   (a) a rigid storage tank having a storage area of at least about 1,000 gallons of liquid;
   (b) a fill pipe extending from near ground surface into the storage tank for delivering liquid therethrough;
   (c) a vent line attached to the storage tank and vent extension line extending from the vent line into the storage tank with a lower end of said vent extension line terminating from about two inches to about eighteen inches from a top inside surface of the storage tank, wherein the area within the storage tank which is above the lower end of the vent extension line represents the internal retained capacity area;
   (d) a dispensing line leading from within the storage tank to a dispenser at ground surface;
   (e) a trapped vapor release valve in operable association with the retained capacity area so that when closed during a filling operation a build up of pressure occurs within the storage tank to prevent liquid from completely occupying the internal retained capacity area and when opened permits excess liquid in the fill pipe to freely flow into the retained capacity area; and
   (f) a by-pass vent line extending from the trapped vapor release valve to the vent line so that upon the opening of the trapped vapor release valve trapped vapors in the internal retained capacity area exit the storage tank through the by-pass vent line and vent line so as to permit the excess liquid in the fill pipe to freely flow.

2. The storage tank system of claim 1 wherein the vent extension line extends from about two inches to about five inches into the storage tank.

3. The storage tank system of claim 2 wherein the fill pipe extends into the storage tank to within about twelve inches of the storage tank's bottom.

4. The storage tank system of claim 1 wherein the storage tank has a manway extending from its top surface and has a lid on top of said manway and further wherein the area within the manway represents at least a part of the storage tank's storage area.

5. The storage tank system of claim 4 wherein at least a part of the area within the manway represents the storage tank's internal retained capacity area.

6. The storage tank system of claim 5 further wherein the fill pipe, vent line and dispensing line are attached to the lid on the manway.

7. The storage tank system of claim 1 wherein the storage tank holds at least about 4,000 gallons of liquid.

8. The storage tank system of claim 1 further comprising a vapor recovery tube which is attached to the storage tank, and a vapor recovery extension tube extending therefrom into the storage tank with a lower end of said vapor recovery extension tube terminating from about two inches to about eighteen inches from a top inside surface of the storage tank, said vapor recovery tube and vapor recovery extension tube for receiving vapors formed within the storage tank during the filling operation and returning said vapors to the transport truck and further wherein the area within the storage tank which is above the uppermost of the lower ends of the vent extension line and vapor recovery extension tube represents the internal retained capacity area.

9. The storage tank system of claim 8 wherein the vent extension line and the vapor recovery extension tube each extend individually from about two inches to about five inches into the storage tank.

10. The storage tank system of claim 9 wherein the vapor recovery extension tube extends into the storage tank to a level greater than that of the vent extension line and the area within the storage tank above the lower end of the vent extension line represents the internal retained capacity area.

11. The storage tank system of claim 9 wherein the vapor recovery extension tube extends into the storage tank to a level less than that of the vent extension line and the area within the storage tank above the lower end of the vapor recovery extension tube represents the internal retained capacity area.

12. The storage tank system of claim 9 wherein the vent extension line extends into the storage tank to a level approximately equal to that of the vapor recovery extension tube.

13. The storage tank system of claim 1 further comprising a vapor recovery tube which is attached to the vent line, said vapor recovery tube for receiving vapors formed within the storage tank during the filling operation and returning said vapors to the transport truck.

* * * * *